J. E. STEVENS.
HOG FEEDING DEVICE.
APPLICATION FILED SEPT. 20, 1916.

1,238,212.

Patented Aug. 28, 1917.
2 SHEETS—SHEET 1.

Witness.
K. G. Barrett.

Inventor.
J. E. Stevens
By Benjamin, Roadhouse & Lundy
Attys.

J. E. STEVENS.
HOG FEEDING DEVICE.
APPLICATION FILED SEPT. 20, 1916.
1,238,212.
Patented Aug. 28, 1917.
2 SHEETS—SHEET 2.
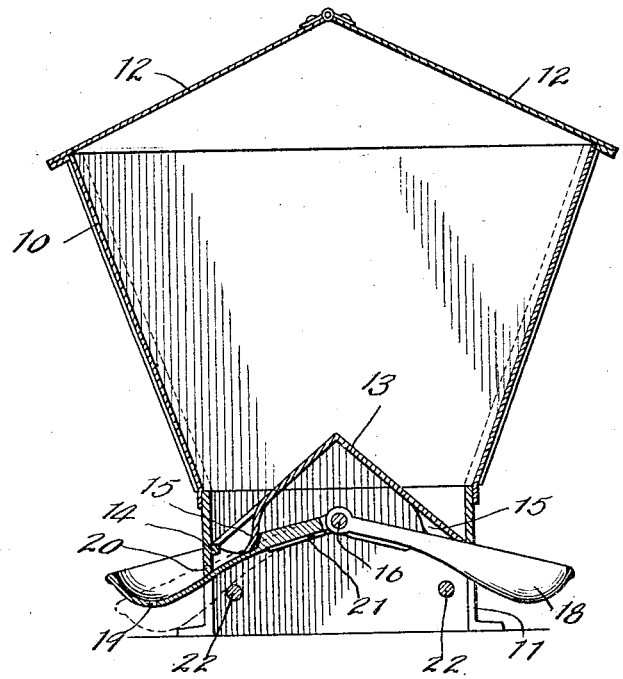
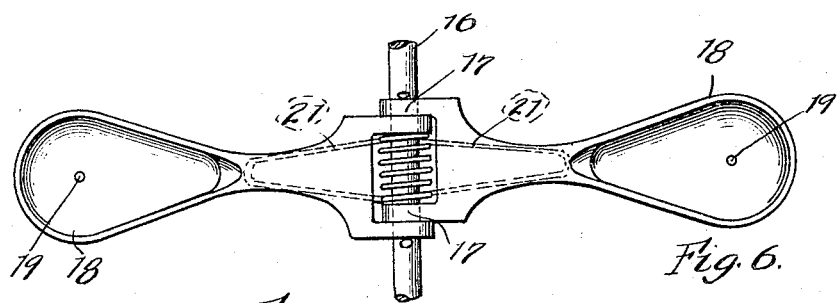
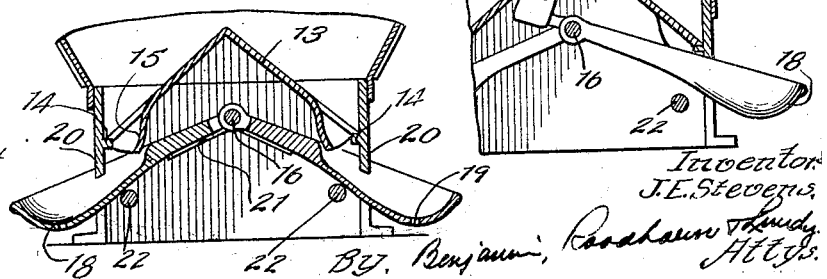

UNITED STATES PATENT OFFICE.

JOHN E. STEVENS, OF KEWANEE, ILLINOIS.

HOG-FEEDING DEVICE.

1,238,212.  Specification of Letters Patent.  Patented Aug. 28, 1917.

Application filed September 20, 1916. Serial No. 121,204.

*To all whom it may concern:*

Be it known that I, JOHN E. STEVENS, a citizen of the United States, and a resident of Kewanee, county of Henry, and State of Illinois, have invented certain new and useful Improvements in Hog-Feeding Devices, of which the following is a specification.

My invention relates to an apparatus for feeding hogs, swine, and other animals, and more particularly to a device that is characterized by a plurality of individual troughs that are adapted to be depressed by the animal desiring to feed.

One of the objects of my invention is the provision of a feeder of this character, the individual troughs whereof are adapted to close automatically when the animal has finished feeding. Another object of my invention is to provide each individual trough with a separate gutter through which it receives the feed from the hopper containing the supply. And a further object of my invention is the provision of a plurality of depressible troughs that are all mounted upon a common pintle. Other objects of my invention are the provision of a feeding apparatus that will prevent, so far as practicable, the animals spilling the feed upon the ground, and also to provide a device that is durable in construction, easy to manipulate, efficient in its operation, and comparatively inexpensive to manufacture.

I prefer to accomplish the divers objects of my invention by substantially the means and in the manner hereinafter fully described and as more particularly pointed out in the claims, reference being had to the accompanying drawings forming a part of this specification, wherein,—

Fig. 3 is a vertical transverse section taken on line 3—3, Fig. 2.

Fig. 4 is a top plan of two oppositely disposed feed troughs drawn to an enlarged scale to illustrate their specific construction and manner of mounting.

Fig. 5 is a fragmentary view similar to Fig. 3, illustrating the operation of the troughs to permit feed to flow into the same.

Fig. 6 is a detail view of a modified form of trough.

Figure 1:
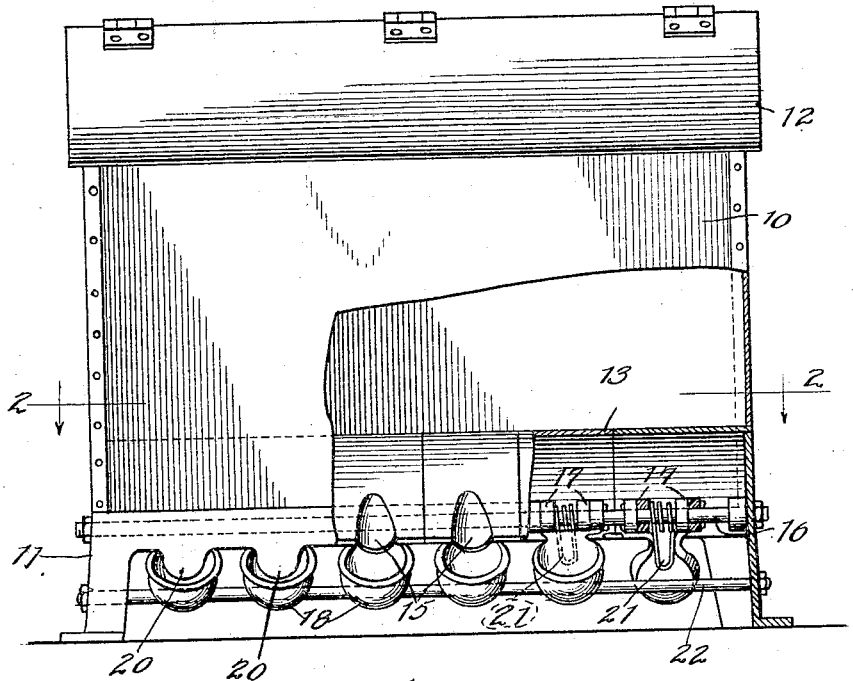
Figure 1 is a longitudinal side elevation of my hog feeding apparatus, the lower portion of one end of the wall being broken away to disclose the interior construction.
Figure 2:
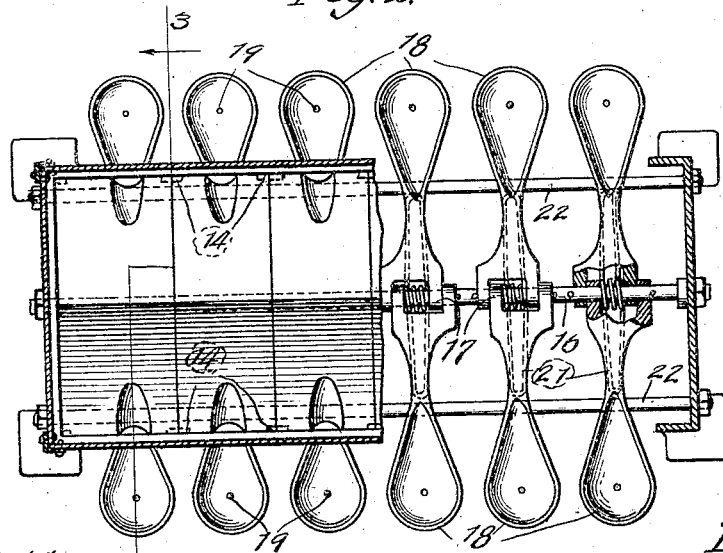
Fig. 2 is a horizontal transverse section taken on line 2—2 of Fig. 1.

Referring to the drawings wherein similar reference characters are employed to designate like parts throughout the figures, it will be observed my improvement preferably comprises a suitable receptacle 10 of substantially hopper shape and constructed of sheet metal that is mounted upon a suitable cast metal base 11 and its upper open end is closed by two suitable doors 12. The bottom of the receptacle is preferably closed by a plurality of bottom plates 13 of inverted V-shape in cross-section that are constructed either of cast metal or pressed sheet metal so as to provide a peak or ridge that is adapted to shed the feed in the receptacle toward the opposite longitudinal side walls thereof. This bottom is made in sections, as before mentioned, so as to facilitate assembly and also for the purpose of permitting the receptacle to be enlarged by adding additional bottom plates and associated elements and by enlongating the body portion. These plates 13 rest upon suitable lugs 14, extended inwardly from the vertical walls of the base and each side of these plates 13 is provided with a pronounced depression 15 so as to provide gutters that are adapted to distribute the feed in relatively small streams.

Disposed below and in alinement with the gutters 15 are individual feed troughs that are mounted upon a central and longitudinally disposed rod or bar 16. These troughs preferably comprise a casting having pivotal lugs 17 that are adapted to mount the troughs upon the rod 16 and the opposite end of the casting is preferably dished out, spoonlike, to provide a receptacle 18 from which the hog or other animal, may feed. The spoonlike end 18 is preferably so shaped that in operation it will form a continuation of the gutters 15 in the bottom plates 13, and each is provided with a drip opening 19 from which rain, melted snow or other liquids may drain so as to retain the trough as dry as possible.

The troughs above described are adapted to be normally held in the positions shown in Figs. 1 and 3 of the drawings, in which positions suitable semicircular extensions 20, depending from the front wall of the receptacle above said troughs, will extend into same and close the space between said trough and the said extensions 20. In order that the animal feeding may receive the food in quantities to prevent spilling or dropping the same upon the ground, these troughs are made automatically returnable and this is done by a suitable spring 21 that surrounds the rod or bar 16 and is provided with loops that extend toward and under the oppositely disposed troughs. These springs 21 keep the troughs normally pressed upwardly and when the hog or other animal is feeding the troughs are capable of being depressed by the lower jaw of the animal so that additional feed will be discharged through the respective gutter into the trough. Suitable longitudinally disposed rods, 22, extended from end to end of the receptacle, limit the distance to which the troughs may be depressed.

While I have herein illustrated and described certain specific means for carrying out my invention, it, of course, will be obvious to others skilled in the art to which my invention pertains, that divers modifications or refinements thereof may be made without materially departing from the spirit of my invention. For example: the troughs, which I have described as automatically returnable, may be provided with weights 23 upon their inner ends, as shown in Fig. 6 of the drawings, in lieu of the springs I have shown in the preferred form. These weights will perform the same function and cause the troughs to be held normally in closed position, as will be obvious. I therefore desire it understood that all such changes and alterations are contemplated as included within the scope of my invention as expressed in the appended claims.

What I claim is:—

1. A hog feeding device comprising a suitable receptacle provided with a bottom having a plurality of outwardly discharging gutters that project below the same, an individual trough extending under said bottom for each gutter adapted to receive the discharge therefrom, and means whereby each trough is adapted to be depressed independently of the remaining troughs.

2. A hog feeding device comprising a suitable receptacle provided with a bottom having a plurality of outwardly discharging gutters that project below the same, an individual trough extending under said bottom for each gutter adapted to receive the discharge therefrom, and means whereby each trough is adapted to be depressed independently of the remaining troughs and is automatically returned to its normal position.

3. A hog feeding device comprising a suitable receptacle provided with a bottom the longitudinal sides whereof are oppositely inclined, a plurality of discharge gutters in said bottom that project below the same, an individual trough extending under said bottom for each gutter disposed to receive the discharge therefrom, and means for pivoting each trough adjacent said bottom and separate from each other.

4. A hog feeding device comprising a suitable receptacle having a discharge bottom therein, a plurality of troughs adjacent said bottom each provided with a spoonlike receptacle adjacent its outer end, a pivotal boss at its opposite inner end, and a pivotal bar upon which said troughs are movably mounted.

5. A hog feeding device comprising a suitable receptacle having a discharge bottom therein, a plurality of troughs adjacent said bottom each provided with a spoonlike receptacle adjacent its outer end, a pivotal boss at its opposite inner end, a pivotal bar upon which said troughs are movably mounted, and means for automatically returning said troughs to their normal positions.

6. A hog feeding device comprising a suitable receptacle having a plurality of gutters in the bottom thereof, depressible automatically returnable troughs mounted adjacent said gutters and extended beyond the vertical wall of said receptacle, and extensions on said vertical wall depending into said troughs whereby when said troughs are in normal position feed is prevented from discharging into said troughs from said gutters.

7. A hog feeding device comprising a substantially rectangular-shaped receptacle having a discharge bottom, a plurality of oppositely disposed depressible troughs disposed to receive the discharge from said bottom, and a common support upon which all of said troughs are pivoted separately from each other.

8. A hog feeding device comprising a substantially rectangular-shaped receptacle having a discharge bottom, a plurality of pivoted automatically returnable troughs disposed adjacent said bottom, and a pivotal rod extended from end to end of said receptacle upon which said troughs are movably mounted.

Signed at Kewanee, county of Henry and State of Illinois, this 16th day of September, 1916.

JOHN E. STEVENS.

Witnesses:
ALTON RAY PARKER,
ORA WARD PARKER.